US009891643B2

(12) United States Patent
El-Nozahi et al.

(10) Patent No.: US 9,891,643 B2
(45) Date of Patent: Feb. 13, 2018

(54) CIRCUIT TO IMPROVE LOAD TRANSIENT BEHAVIOR OF VOLTAGE REGULATORS AND LOAD SWITCHES

(71) Applicant: Vidatronic, Inc., College Station, TX (US)

(72) Inventors: Mohamed Ahmed Mohamed El-Nozahi, Heliopolis (EG); Faisal Abdellatif Elseddeek Ali Hussien, Cairo (EG); Mohamed Mostafa Saber Aboudina, Giza (EG); Sameh Ahmed Assem Mostafa Ibrahim, Cairo (EG); Moises Emanuel Robinson, College Station, TX (US)

(73) Assignee: Vidatronic, Inc., College Station, TX (US)

( * ) Notice: Subject to any disclaimer, the term of this patent is extended or adjusted under 35 U.S.C. 154(b) by 57 days.

(21) Appl. No.: 14/959,993

(22) Filed: Dec. 4, 2015

(65) Prior Publication Data

US 2016/0161961 A1 Jun. 9, 2016

Related U.S. Application Data

(60) Provisional application No. 62/088,250, filed on Dec. 5, 2014.

(51) Int. Cl.

| | |
|---|---|
| ***G05F 1/00*** | (2006.01) |
| ***H02H 7/00*** | (2006.01) |
| ***G05F 1/56*** | (2006.01) |

(52) U.S. Cl.
CPC .................................... *G05F 1/56* (2013.01)

(58) Field of Classification Search
CPC . G05F 1/461; G05F 1/562; G05F 1/56; G05F 1/575; G05F 1/565
USPC .......... 323/246, 274, 282, 284, 289; 361/18
See application file for complete search history.

(56) References Cited

U.S. PATENT DOCUMENTS

| | | | | |
|---|---|---|---|---|
| 5,864,227 | A * | 1/1999 | Borden | G05F 3/247 323/280 |
| 6,201,375 | B1 | 3/2001 | Larson et al. | |
| 6,680,837 | B1 * | 1/2004 | Buxton | H02H 3/087 327/309 |
| 7,714,553 | B2 | 5/2010 | Lou | |
| 7,821,242 | B2 * | 10/2010 | Takagi | G05F 1/618 323/275 |
| 8,344,713 | B2 | 1/2013 | Shrivas et al. | |
| 2003/0006743 | A1 * | 1/2003 | Miyazaki | G05F 1/618 323/282 |
| 2013/0307505 | A1 * | 11/2013 | Daniel | H03K 17/18 323/282 |

* cited by examiner

*Primary Examiner* — Gary Nash
(74) *Attorney, Agent, or Firm* — Osha Liang LLP

(57) ABSTRACT

A method to adjust the load transient regulation of a low drop-out (LDO)/load switch linear voltage regulator (LVR) with an n-type pass element having an open loop transfer function, including determining during a load transient event if the gate of the pass—element goes lower than a scaled value of the output voltage or a constant voltage level, generating a control signal that controls a current sink block if the gate voltage of the pass element is lower than the output voltage, and enabling a current sink block that is controlled by the control signal and connecting the output of the current sink block to the output of the LVR.

11 Claims, 8 Drawing Sheets

CIRCUIT TO IMPROVE LOAD TRANSIENT BEHAVIOR OF VOLTAGE REGULATORS AND LOAD SWITCHES

CROSS-REFERENCE TO RELATED APPLICATIONS

This Application claims the benefit of U.S. Provisional Application 62/088,250 filed on Dec. 5, 2014.

BACKGROUND

A low-dropout (or LDO) linear voltage regulator is a DC linear voltage regulator, which can operate with a very small input-output differential voltage. The LDO linear voltage regulator is commonly referred to as simply "LDO." The advantages of a low dropout voltage regulator include a lower minimum operating voltage, better supply rejection, and lower output noise when compared to switching type regulators. The main components of a typical LDO linear voltage regulator may include a power FET (e.g., power MOSFET or an equivalent component) and a differential amplifier (i.e., an error amplifier). The FET and the differential amplifier cooperate to regulate the output voltage. The differential amplifier has two inputs: one is used to monitor the output voltage, which is typically determined by a ratio of two resistors, and the other is a stable voltage reference (e.g. a bandgap reference). If the output voltage rises too high (or drops too low) relative to the reference voltage, the signal that controls the power FET changes to maintain a constant output voltage.

An example of an LDO is illustrated in FIG. 1, which shows a schematic block diagram of an LDO linear voltage regulator (100). As shown in FIG. 1, the feedback network (106), including a resistor divider (103) and an error amplifier (102), regulates the DC output voltage $V_{out}$ to a desired level given by $V_{out}=V_{ref}*(1+R_2/R_1)$. The error amplifier (102) may be a single stage or a multi-stage amplifier. The resistor R2 may be a short circuit, and/or the resistor R1 may be an open circuit in some architectures. The pass element $M_{pass}$ (101) may be either a field effect transistor (FET), a bipolar transistor, an LDMOS transistor or a FinFET device, and may be of either n-type or p-type. Multi-stage and high-gain amplifiers are typically used as the implementation of the error amplifier (102) in the feedback network (106). $C_L$ (104) represents the sum of a physical external capacitor, any other capacitor that models the input capacitance of the load, and any additional parasitic capacitance. The external capacitor is not located inside the same silicon die as the LDO and instead is placed on the printed circuit board (PCB) or inside the microchip package. Some LDO architectures do not require an external capacitor, $C_L$ (104) (commonly referred as capacitor-less LDO), while other LDO architectures require this external capacitor, $C_L$ (104). The current source, $I_L$ (105) models the current that is being consumed by the load connected at the output terminal, $V_{out}$, of the linear voltage regulator.

Architectures that require an external capacitor to guarantee the stability of the LDO usually have superior performance over capacitor-less architectures. These performance parameters include both superior power supply rejection (PSR) and load transient regulation. Power supply rejection is the ability of the LDO to reject any noise coming from the supply through the $V_{in}$ terminal in FIG. 1. Throughout this disclosure, the terms, "power supply," "supply," "$V_{in}$," and "$V_{in}$ terminal" may be used interchangeably to refer to the power source input to a voltage regulator. Load transient regulation is the change in the output voltage $V_{out}$ when there is an instantaneous change in the load current, $I_L$ (105). Load transient regulation lower than 20 mV is typically achieved when there is a step in the load current from/to 10 mA to/from 300 mA in 1 μsec, and an external capacitor is used. However, when the load current changes from/to values lower than 1 mA to/from a higher value, the output voltage can drop significantly reaching a load transient regulation higher than 0.5 V (in some cases it can reach a value higher than 1V) even with an external capacitor.

FIG. 2 (200) shows the simulation results of the output voltage of a conventional prior art LDO (100) when the pass element is implemented using an N-type FET. In this simulation, the load current changes from 0 mA to 100 mA in 1 μsec and an external capacitor (104) of 1 μF is used as the load capacitor. As depicted, the output voltage drops by 0.6 V during the load transient phase. Such a performance is not acceptable for many linear voltage regulators. The main reason for the degradation of load transient regulation is explained as follows:

Assume that the linear voltage regulator is initially supplying the maximum load current. In the example shown in FIG. 2 (200), this value of current is 100 mA. When the load current suddenly drops to a value lower than 1 mA, the linear voltage regulator keeps supplying the 100 mA until the loop responds to the change in the load current. This 100 mA charges the output capacitor, $C_{ext}$, instantaneously, forcing the output voltage to increase by a value $\Delta V_{out}$. As a result, the input to the differential amplifier (102) increases, forcing the gate of the pass element $M_{pass}$ (101) to suddenly drop to zero, and thus, $M_{pass}$ is turned off. During this phase, the voltage regulator loop which consists of elements (101), (102), (103), (104), (105), and (106), does not respond to any load or supply changes, and the loop does not regulate the output voltage based on input voltage changes. The linear voltage regulator (100) exits this state when the excess voltage ($\Delta V_{out}$), is discharged through the feedback network $R_1$ and $R_2$, and the load current $I_L$. The discharge time can be much larger than 1 msec. When the output voltage reaches the correct regulator output level, the input to the differential amplifier (102) decreases, and thus the gate of the pass element Mpass increases. This forces Mpass to start working again and the loop can now settle and regulate the output voltage to the desired voltage value.

In the case that the load current increases before the output voltage settles to the desired value, the output drops significantly reaching a ΔVout change of at least 0.6 V as demonstrated by FIG. 2. This is because during this event, the loop of the linear voltage regulator is broken as explained above, and the pass element (101) Mpass is off and it is not capable of supplying the required load current. The simulation result in FIG. 2 shows that the prior art linear regulators cannot be used in many applications that have a sudden change in the load current from/to values lower than 1 mA to/from higher values.

The load switch regulator has substantially the same structure as the LDO voltage regulator. The main difference between the LDO and the load switch regulator is the reference voltage ($V_{ref}$). In the case of the LDO voltage regulator, $V_{ref}$ is supply independent and usually generated by a bandgap reference voltage circuit. In the case of the load switch regulator, $V_{ref}$ is a scaled (and filtered) version of the DC value of the supply (Vin). Thus, the DC level of the output voltage $V_{out}$ changes proportionally with the DC level of the input voltage $V_{in}$. Accordingly, the block diagram shown in FIG. 1 may also be used to represent a load switch regulator with an external capacitor or without an external capacitor (a capacitor-less load switch regulator). Similar to the conventional LDO voltage regulators, the prior art load switch regulators have a limited load transient regulation performance of about 1V for a step in the load current from/to less than 1 mA to/from 100 mA or larger load currents in 1 μsec. Throughout this disclosure, the terms “load switch regulator,” “load switch linear voltage regulator,” and “load switch” may be used interchangeably. Further, the term “LDO/load switch linear voltage regulator” refers to either an LDO or a load switch depending on specific configurations of the reference voltage used.

U.S. Pat. No. 8,344,713 B2 discusses an analog circuit where a load transient circuit is introduced to enhance the transient load regulation response for large variations in load current. This is achieved by sensing the variations in the output voltage through capacitive coupling, and then controlling the gate of the pass element Mpass. Thus, this approach senses the output voltage and controls directly the gate of the pass element. The circuit is implemented using two capacitors and two current mirrors. This approach does not solve the issue that is being addressed in this patent because if the loop stops regulating the output, the circuit is not able to instantaneously recover the state of the output voltage. In addition, this approach typically results in a degraded power supply rejection performance.

U.S. Pat. No. 7,714,553 B2 discusses an analog circuit where a load transient regulation circuit is proposed to enhance the transient load regulation response for large variations of the load current. This is achieved by comparing a feedback signal to a defined voltage called Vref. Then, the gate of the pass element is discharged to overcome the large overshoot/undershoot of the output voltage. It is important to emphasize that this approach senses a feedback signal and compares it to a constant reference voltage. The control signal is then applied to the gate of the pass element. A similar approach in which the sense signals are the same as the ones presented in U.S. Pat. No. 7,714,553 B2 was discussed in U.S. Pat. No. 6,201,375, but the control signal is applied to the output of the linear regulator.

SUMMARY

In general, in one aspect, the invention relates to a novel architecture and method to improve the load transient regulation of a low drop-out (LDO)/load switch linear voltage regulator (LVR). In accordance with some embodiments of the invention, an architecture and method to determine, during a load transient event if the gate of an n-type pass element goes lower than the output voltage; and generate, a control signal that controls a current sink block if the gate voltage of the pass element is lower than a scaled value of the output voltage or a constant voltage level; and producing a current source that is controlled by the control signal and connecting the output of the current sink block to the output of the LVR.

In general, in one aspect, the invention relates to a novel architecture and method to improve the load transient regulation of a low drop-out (LDO)/load switch linear voltage regulator (LVR). In accordance with some embodiments of the invention, an architecture and method to determine, during a load transient event if the gate of a p-type pass element reaches a value near the input supply level or a constant voltage level; and generating, a control signal that controls a current sink block if the and the output voltage is higher than a targeted output level; and enabling a current sink block that is controlled by the control signal and connecting the output of the current sink block to the output of the LVR.

BRIEF DESCRIPTION OF DRAWINGS

The appended drawings illustrate several embodiments of the invention and are not to be considered limiting of its scope, for the invention may admit to other equally effective embodiments.

DETAILED DESCRIPTION

Figure 1:
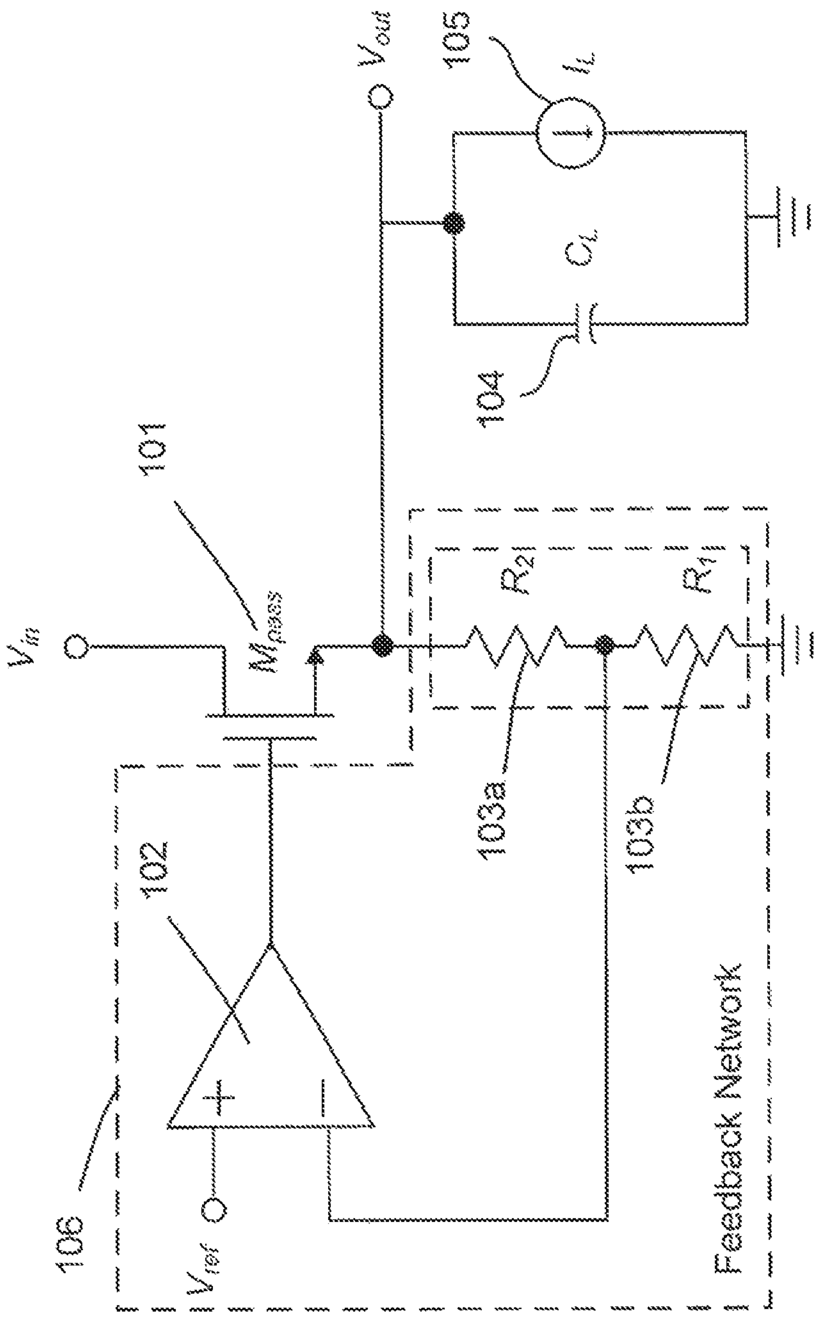
(Prior Art) FIG. 1
FIG. 1 shows a schematic block-level circuit diagram of an LDO/load switch linear voltage regulator, in which embodiments of the invention may be implemented.

Aspects of the present disclosure are shown in the above-identified drawings and are described below. In the description, like or identical reference numerals are used to identify common or similar elements. The drawings are not necessarily to scale and certain features may be shown exaggerated in scale or in schematic in the interest of clarity and conciseness.

Embodiments of the invention relate to an LDO and/or load switch linear voltage regulator with improved load transient regulation for a step in the load current ranging from values lower than 1 mA to a significantly higher value. In one or more embodiments of the invention, the improved LDO/load switch architecture achieves a load transient regulation better than 0.1 V for a load current step from/to 1 mA to/from 100 mA in 1 μsec. Without the invention, the load transient regulation reaches a value higher than 0.6 V for the same test case. The following features of the invention will be described using the LDO as an example. Those skilled in the art, with the benefit of this disclosure will appreciate that same or similar features are equally applicable to the load switch as well.

In one or more embodiments, the LDO linear voltage regulator with the improved feedback network is implemented on a microchip, such as a semiconductor integrated circuit. In one or more embodiments, the improved LDO may function properly with or without an external capacitor. Throughout this disclosure, the terms “LDO,” “LDO linear voltage regulator,” “improved LDO,” and “LDO linear voltage regulator with the improved feedback network” may be used interchangeably depending on the context.

Figure 2:
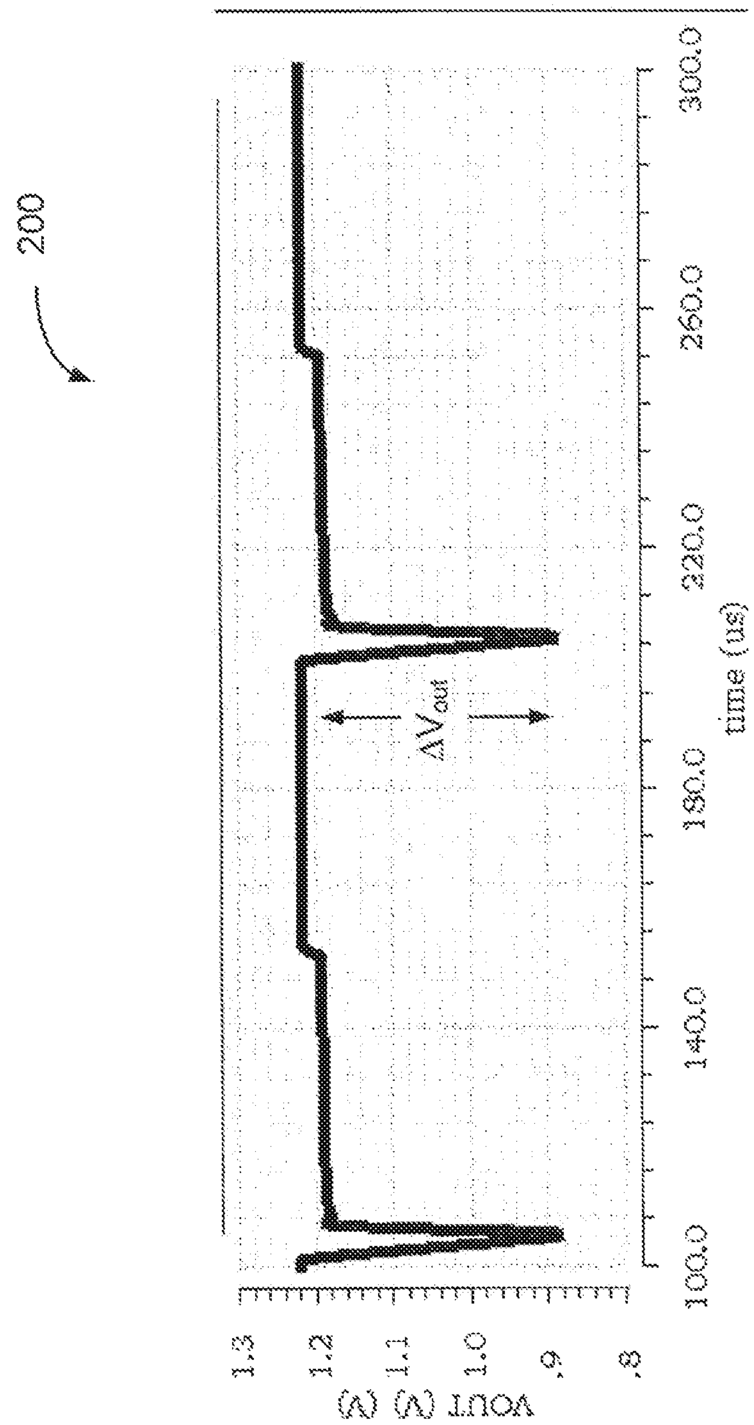
(Prior Art) FIG. 2
FIG. 2 shows example load transient simulation results of Prior Art LDO linear voltage regulator/load switch

In one or more embodiments, the improved LDO linear voltage regulator has a load transient detection circuit in the feedback network. This load transient detection circuit detects the increase (or decrease) in the output voltage to avoid the degraded load transient performance measured in terms of ΔVout as shown in FIG. 2. This leads to better transient load regulation.

Figure 3:
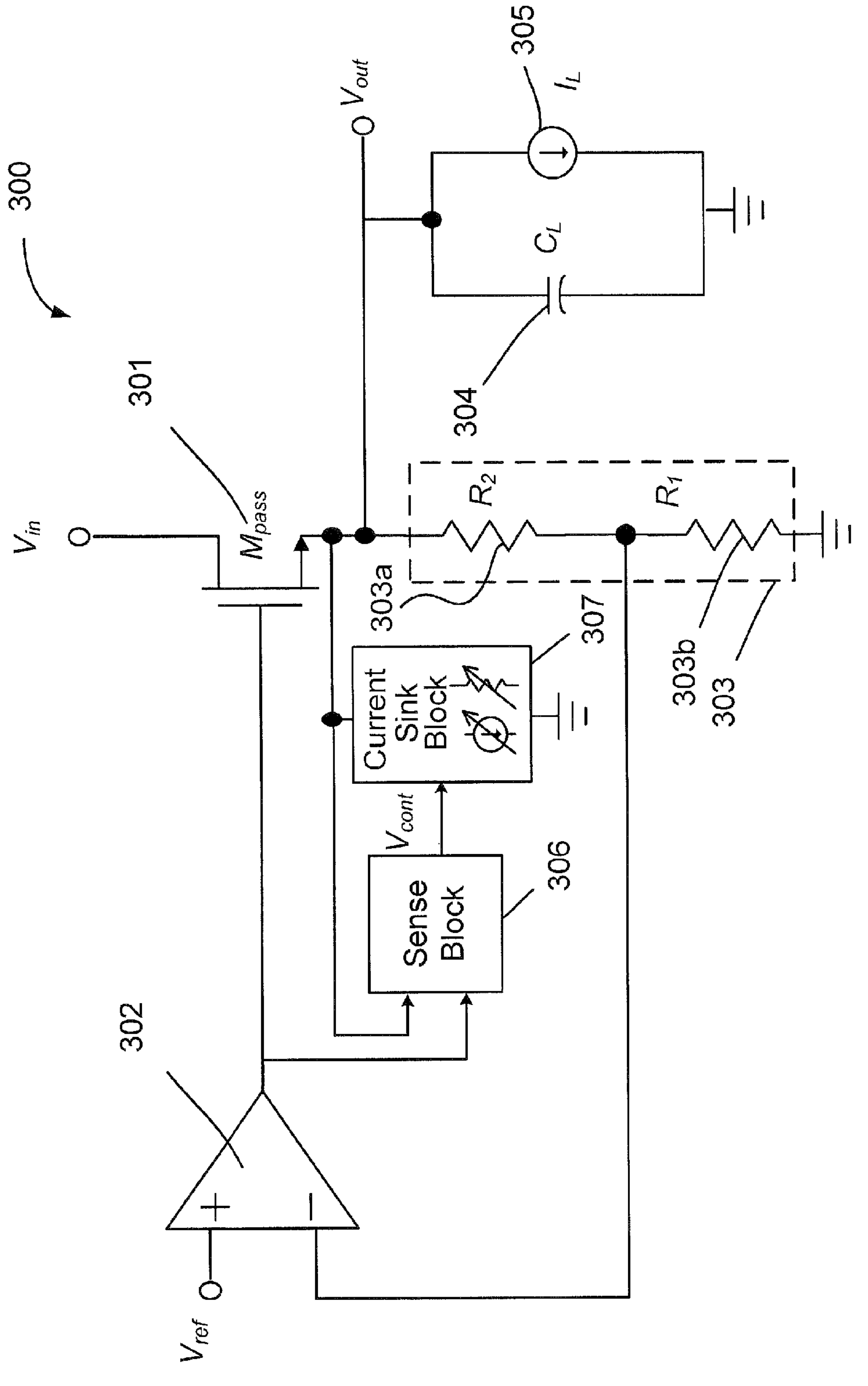
FIG. 3 shows the block diagram of an NMOS LDO linear voltage regulator with the load transient circuit in accordance with embodiments of the invention.

FIG. 3 shows a schematic block-level circuit diagram of an improved LDO (300) that includes a feedback network (including an error amplifier (302) (e.g., a single or multi-stage amplifier, a resistive divider network formed by a resistor R1 (303*a*) and a resistor R2 (303*b*), a pass element $M_{pass}$ (301), a load transient circuit (including a sense block (306), and a current sink block (307)), and a load capacitor $C_L$ (304). Possible implementations of the current sink block, but not limited to, a voltage controlled current source and/or a voltage controlled resistor. In addition, the current source $I_L$ (305) represents a load current of the improved LDO (300). In particular, the improved LDO (300) is essentially the same as the LDO (100) where the load transient circuit ((306) and (307)) described below is added to eliminate the large overshoot/undershoot in Vout (ΔVout) shown in FIG. 2. Although the pass element (301) is shown in FIG. 3 as an NMOS transistor, other types of the devices, such as PMOS transistor, NPN or PNP bipolar junction transistors, LDMOS and FinFETs may also be used. In one or more embodiments, the error amplifier (302) may be a single-stage amplifier or a multi-stage amplifier, and the current sink block (307) can be a current source with resistor possible implementations, but not limited to, a voltage controlled current source and a voltage controlled resistor. In one or more embodiments of the invention, one or more of the modules and elements shown in FIG. 3 may be omitted, repeated, and/or substituted. Accordingly, embodiments of the invention should not be considered limited to the specific arrangements of modules shown in FIG. 3.

In one or more embodiments, reducing the overshoot/undershoot at the output of the LDO during a load transient event from a current lower than 1 mA to a significantly higher value is achieved by including the sense block (306) and a current sink block (307). The sense block (306) senses the difference between the output voltage ($V_{out}$) and the gate voltage of the pass element $M_{pass}$ (301). The sense block (306) can also sense a scaled value of either one of the input voltages (output voltage $V_{out}$ and/or gate voltage of the pass element $M_{pass}$). In case of an N-type pass element, during an event when the load current changes from a high value to a value lower than 1 mA, the output voltage starts to increase, while the gate voltage of the pass element starts to decrease. When the gate voltage is lower than the output voltage, the sense block (306) produces a control signal ($V_{cont}$ in FIG. 3) that is proportional to the difference. In this case, the controlled current source (307) is enabled producing a discharge path to stop increasing the output voltage, and thus reducing $\Delta V_{out}$ as shown in FIG. 2. The current sink block could be sinking a constant current, a current that scales proportionally to the difference of the two inputs to the sense block (306), a current that scales proportionally to the amount of overshoot, or a combination of the aforementioned approaches.

Figure 4:
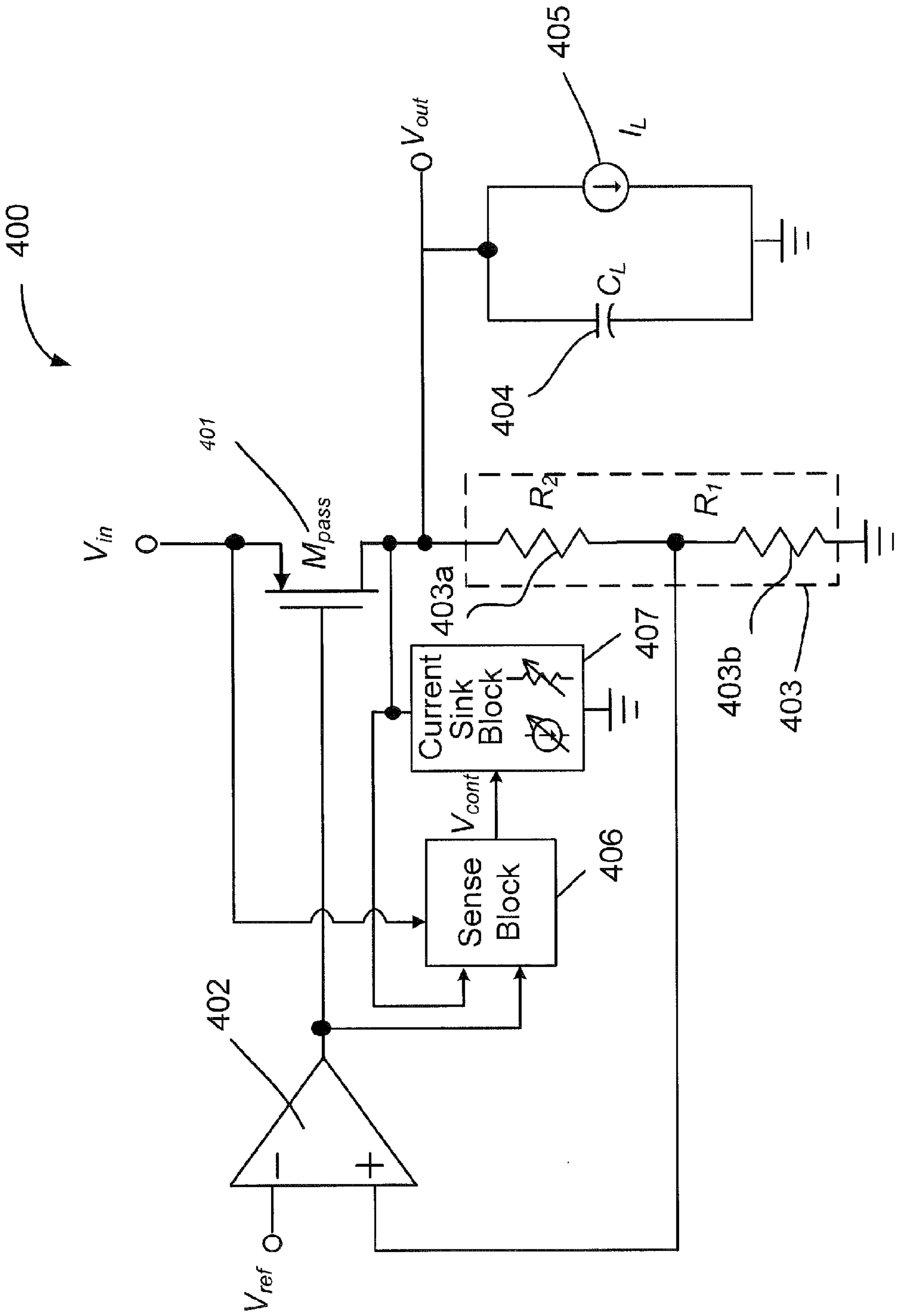
FIG. 4 shows the block diagram of a PMOS LDO linear voltage regulator with the load transient circuit in accordance with embodiments of the invention.

FIG. 4 shows the implementation in case of a P-type pass element is used. In this case, during an event when the load current changes from a high value to a value lower than 1 mA, the output voltage starts to increase, while the gate voltage of the pass element starts to increase too. When the gate voltage reaches (or gets close to) the input supply level, while the output is higher than the expected value, the sense block (406) produces a control signal ($V_{cont}$ in FIG. 4) that is proportional to the amount of overshoot. In this case, the current sink block (407) is enabled producing a discharge path to stop increasing the output voltage, and thus reducing $\Delta V_{out}$ as shown in FIG. 2. Similar to the N-type case, possible implementations of the current sink block, but not limited to, a voltage controlled current source and/or a voltage controlled resistor. The current sink block could be sinking a constant current, a current that scales proportionally to the difference of the two inputs to the sense block (406), a current that scales proportionally to the amount of overshoot, or a combination of the aforementioned approaches.

Figure 5:
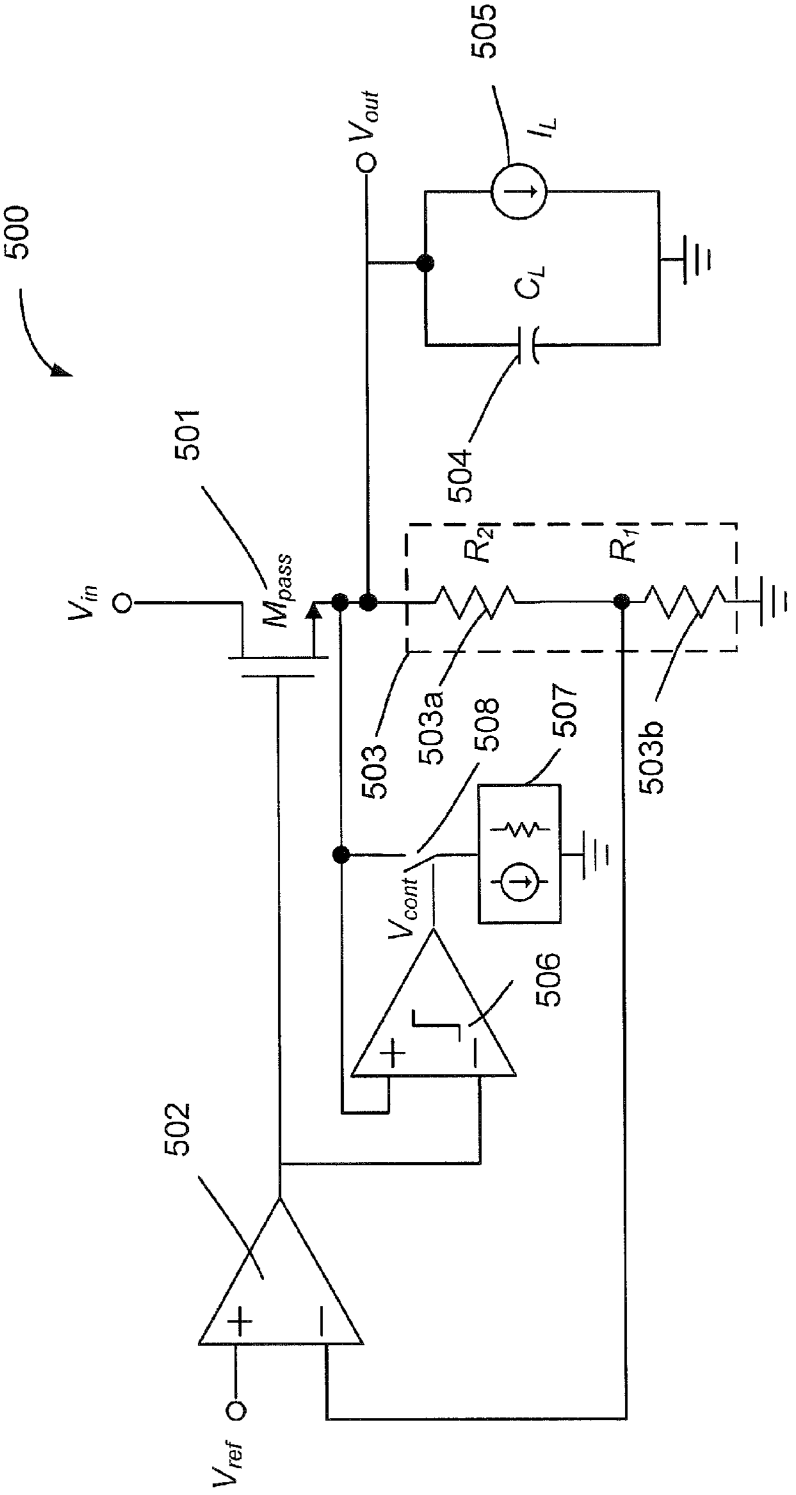
FIG. 5 shows one possible implementation of an NMOS LDO linear voltage regulator with the load transient circuit in accordance with embodiments of the invention.

FIG. 5 shows one possible implementation of the invented load transient circuit in case an N-type pass element is used. The sense block (306) in FIG. 3 is implemented using a comparator (506) in FIG. 5. The current sink block (307) in FIG. 3 is realized using either a constant current, a voltage controlled current source, a voltage controlled resistance, and/or a constant resistance (507) followed by an electronic switch (508) in FIG. 5. FIG. 5 shows the switch (508) at the top of the current sink block (507), but another possible implementation is to have switch at the bottom. When a load transient event happens with a load current changing from a high value to a value lower than 1 mA, the comparator produces a control signal, $V_{cont}$, that enables the switch (508). Once, the output is restored back to the steady state value in which the gate voltage of Mpass (501) is higher than the output, the switch (508) is turned off.

Figure 6:
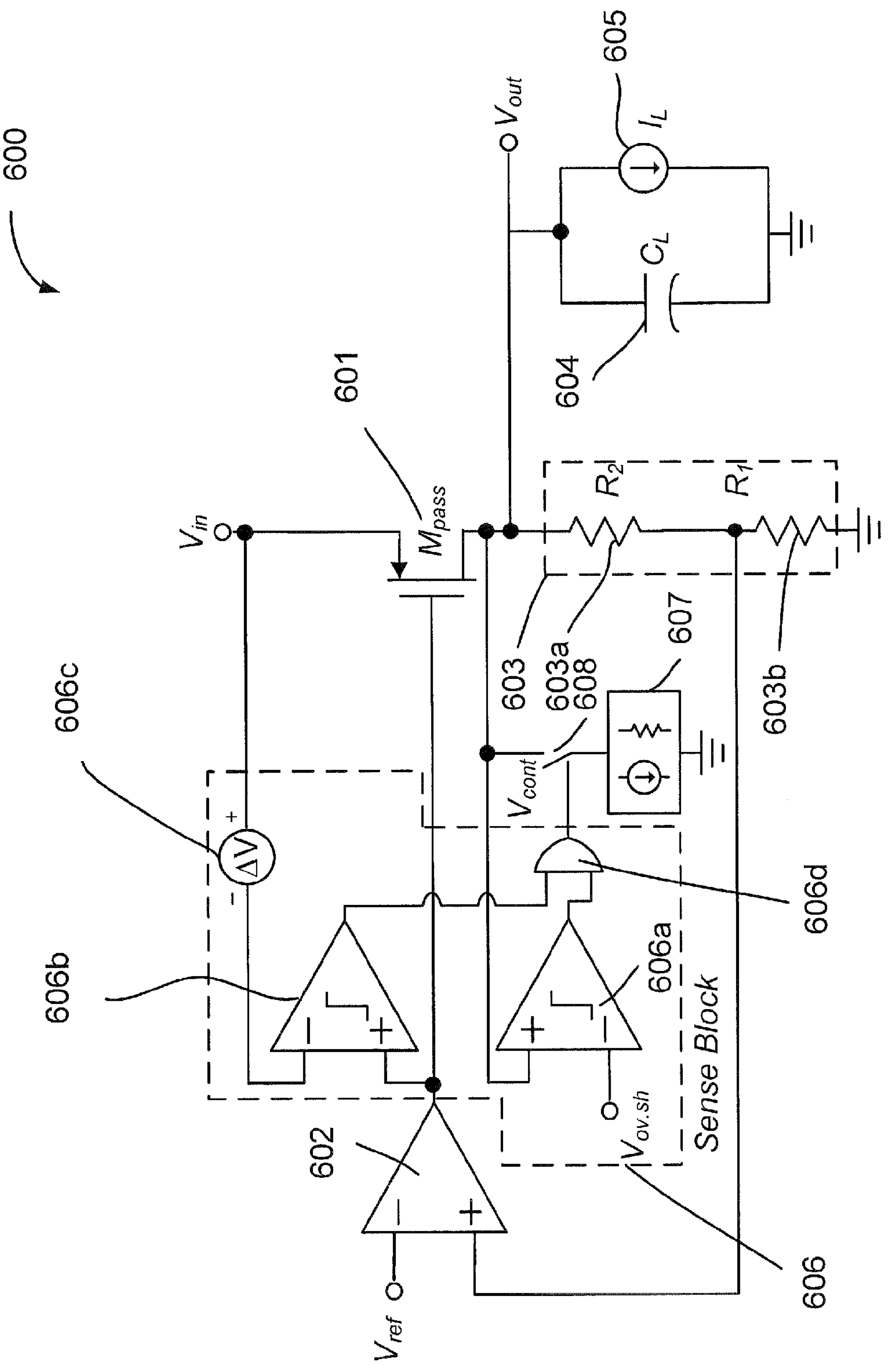
FIG. 6 shows one possible implementation of a PMOS LDO linear voltage regulator with the load transient circuit in accordance with embodiments of the invention.

FIG. 6 shows one possible implementation of the invented load transient circuit in case a P-type pass element is used. The sense block (606) ((406) in FIG. 4) is implemented using two comparators (606*a*) and (606*b*), a voltage shifter (606*c*) and an and gate (606*d*). Comparator (606*a*) is used to detect the overshoot in the output voltage by comparing the output with a defined voltage value defined by $V_{ov.sh}$. The comparator (606*b*) compared the gate of the pass element with a voltage level that is lower by ΔV (606*c*) from the input supply, $V_{in}$. The current sink block (407) in FIG. 4 either a constant current, a voltage controlled current source, a voltage controlled resistance, and/or a constant resistance (607) followed by an electronic switch (608) in FIG. 6. FIG. 6 shows the switch (608) at the top of the current sink block (607), but another possible implementation is to have switch at the bottom. When a load transient event happens with a load current changing from a high value to a value lower than 1 mA, the output of the block (606*d*) produces a control signal, $V_{cont}$, that enables the switch (608). Once, the output is restored back to the steady state value in which the gate voltage of Mpass (601) is higher than the output, the switch (608) is turned off.

Figure 7:
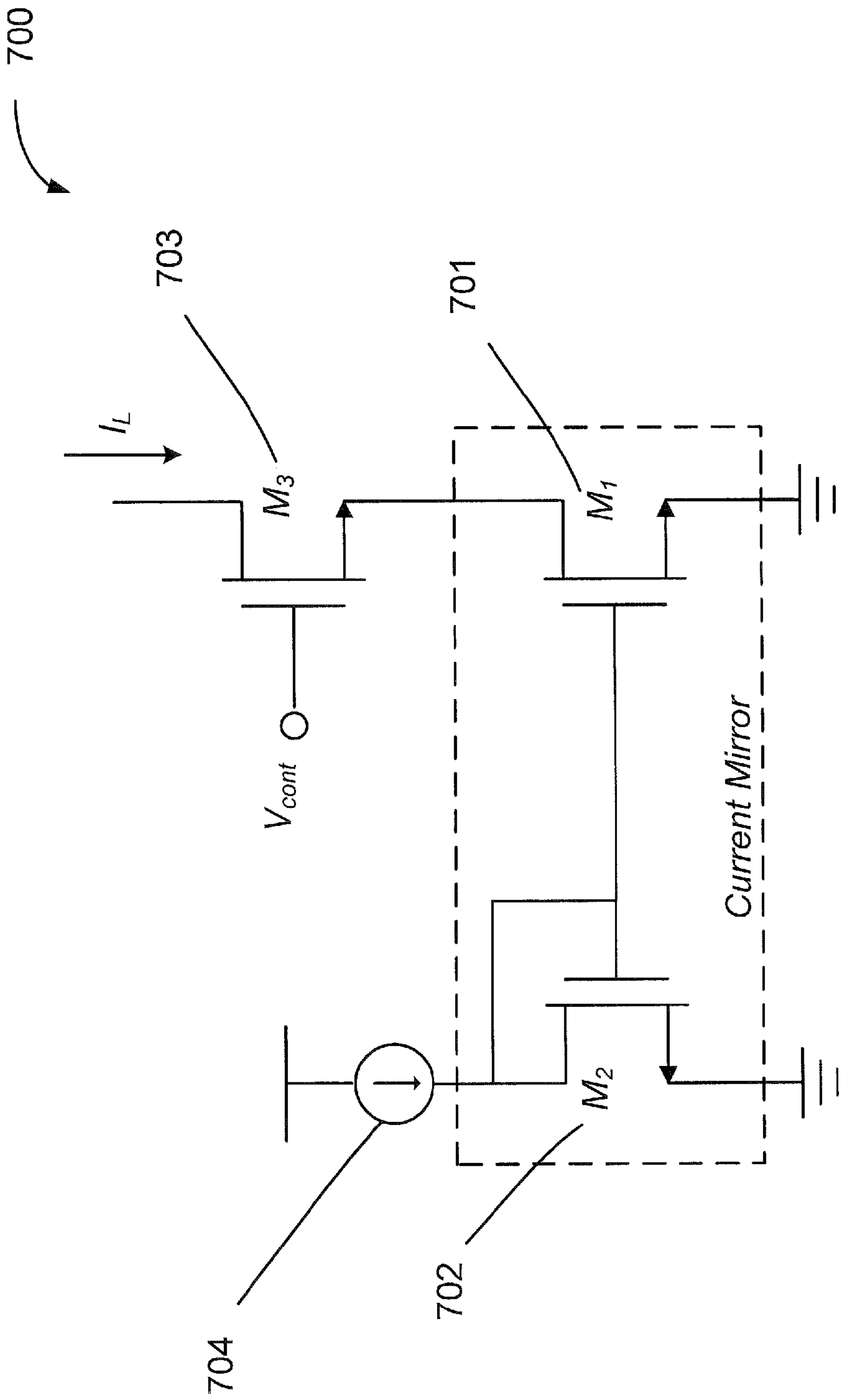
FIG. 7 shows one possible implementation of a voltage controlled current source in accordance with embodiments of the invention.

One possible implementation of the constant current ((507) in FIG. 5, and (607) in FIG. 6) and the switch ((508) in FIG. 5 and (608) in FIG. 6) is shown in FIG. 7. The current source (507) is implemented with the current source (704), the transistor M2 (703), and the transistor M1 (702). The electronic switch ((508) in FIG. 5 and (608) in FIG. 6)) is implemented using the transistor M1 (701) in FIG. 7.

Figure 8:
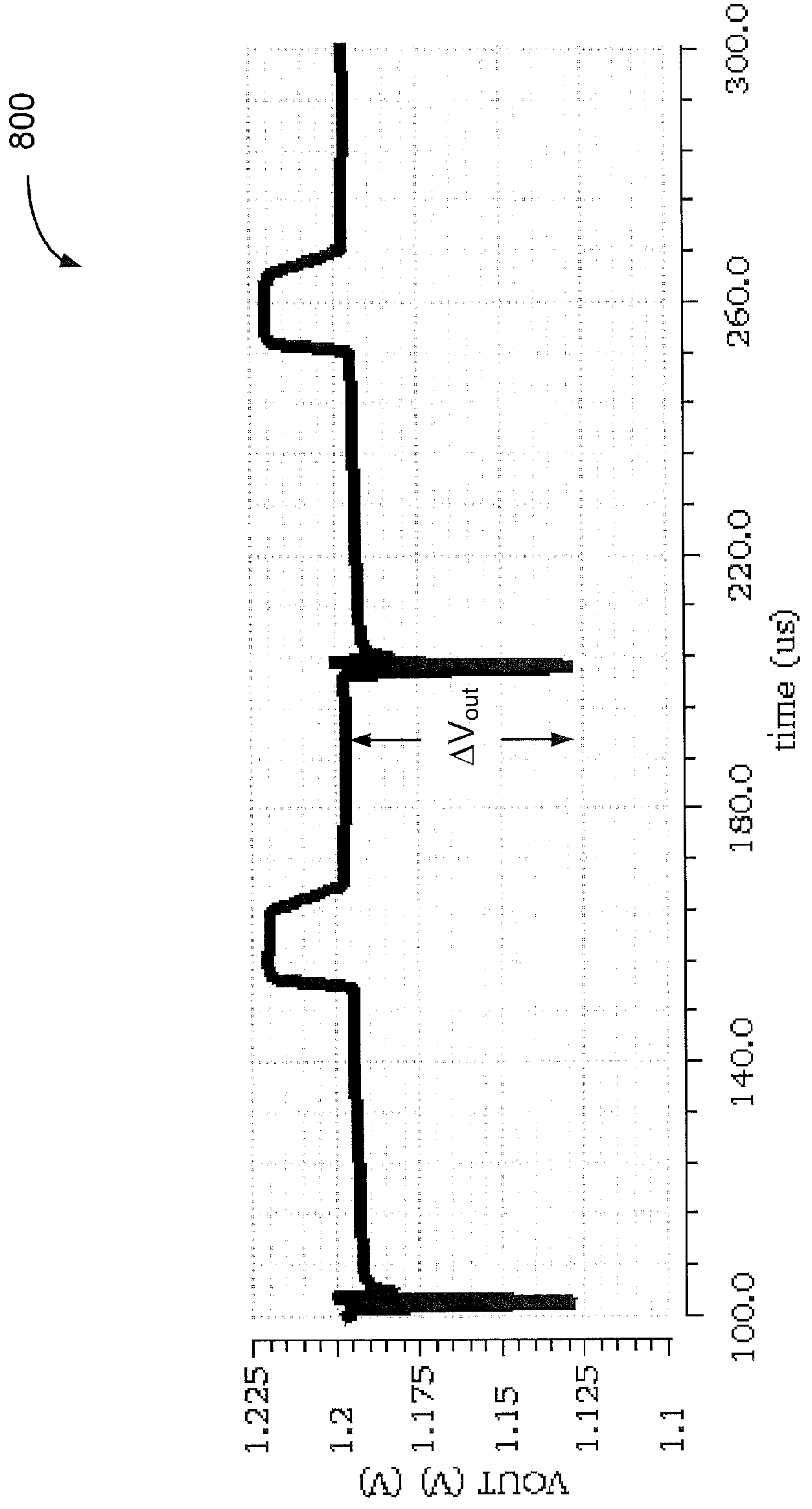
FIG. 8 shows example simulation results for load transient simulation of Prior Art LDO/load switch linear voltage regulator in accordance with embodiments of the invention.

FIG. 8 shows example simulation results for load transient regulation of the improved LDO linear voltage regulator (700) shown in FIG. 7. Specifically, FIG. 8 shows example simulation results for a load capacitance of 1 μF and load current changes from/to 0 mA to/from 100 mA in 1 μsec. This simulation result demonstrates that load transient regulation better than 80 mV is achieved when the load current changes from 0 mA to 100 mA in 1 μsec. In contrast, prior art LDO architectures cannot support this large change in load current and the resulting load transient regulation is worse than 0.6 V for the same test conditions used in the simulated example as demonstrated in FIG. 2.

While the invention has been described for a low drop-out voltage regulator, the same technique and circuit configuration are equally applicable for a load switch. The load switch can be seen as a device having two main terminals: one terminal is for the input supply and the other terminal is for the output voltage (note: the device may include other terminals such as a ground and enable terminal). The output DC voltage changes proportionally with the input DC voltage. The load switch filters the high frequency supply noise without propagating it to the output. Similar to the capacitor-less LDO, there is also a capacitor-less load switch.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to adjust the load transient regulation of a low drop-out (LDO)/load switch linear voltage regulator (LVR) with an n-type pass element having an open loop transfer function, comprising:

determining during a load transient event if a gate voltage of the pass-element goes lower than a scaled value of an output voltage or a constant voltage level;

generating a control signal for controlling a current sink block if the gate voltage of the pass element is lower than the output voltage; and enabling a current sink block that is controlled by the control signal and connecting an output of the current sink block to an output of the LVR, wherein the control signal is proportional to amount of overshoot of the output voltage or the control signal is a digital signal that indicates the output voltage is higher than an expected value.

2. A method to adjust the load transient regulation of a low drop-out (LDO)/load switch linear voltage regulator (LVR) with a p-type pass element having an open loop transfer function, comprising:

determining during a load transient event if a gate voltage of the pass element reaches a value near an input supply voltage level or a constant voltage level;

generating a control signal for controlling a current sink block if an output voltage is higher than a targeted output voltage level; and enabling a current sink block that is controlled by the control signal and connecting an output of the current sink block to an output of the LVR, wherein the control signal is proportional to amount of overshoot of the output voltage or the control signal is a digital signal that indicates the output voltage is higher than an expected value.

3. A low drop-out (LDO)/load switch linear voltage regulator (LVR) circuit with an n-type pass element having an open loop transfer function, comprising:

a load transient circuit that detects if a gate voltage of the n-type pass element goes lower than a scaled value of the output voltage or a constant voltage level, wherein the load transient circuit generates a control signal to control a current sink block if the gate voltage of the pass element is lower than the scaled value of the output voltage, and wherein an output of the current sink block is connected to an output of the LVR and produces an output current that is proportional to the control signal, and wherein the control signal is proportional to amount of overshoot of the output voltage or the control signal is a digital signal that indicates the output voltage is higher than an expected value.

4. The LVR circuit of claim 3, wherein the n-type pass element comprises at least one selected from a group consisting of field effect transistor, and a bipolar junction transistor, an LDMOS, and a FinFET device.

5. The LVR circuit of claim 3, wherein the control signal is proportional to a difference between the inputs of load transient circuit or a digital signal that indicates which input is higher.

6. The LVR circuit of claim 3, wherein the output current of the current sink block is proportional to the input.

7. The LVR circuit of claim 3, wherein the load transient circuit and the current sink block current source reduce the amount of overshoot/undershoot in the output voltage as a result of a load transient event.

8. A low drop-out (LDO)/load switch linear voltage regulator (LVR) circuit with a p-type pass element having an open loop transfer function, comprising:

a load transient circuit that detects if a gate voltage of the p-type pass element reaches a value near the input supply level or a constant voltage level, and the load transient circuit generates a control signal to control a current sink block if an output voltage is higher than an expected value, wherein an output of the current sink block is connected to an output of the LVR and produces an output current that is proportional to the control signal, and wherein the control signal is proportional to amount of overshoot of the output voltage, or the control signal is a digital signal that indicates the output voltage is higher than an expected value.

9. The LVR circuit of claim 8, wherein the p-type pass element comprises at least one selected from a group consisting of field effect transistor, and a bipolar junction transistor, and an LDMOS, and a FinFET device.

10. The LVR circuit of claim 8, wherein the output current of the current sink block is proportional to the input.

11. The LVR circuit of claim 8, wherein the load transient circuit and the current sink block reduce the amount of overshoot/undershoot as a result of a load transient event.

* * * * *